(12) United States Patent
Berto

(10) Patent No.: US 6,308,590 B1
(45) Date of Patent: Oct. 30, 2001

(54) HANDLEBAR DEVICE

(76) Inventor: Joseph Berto, 6539 Rogue River Dr., Shady Cove, OR (US) 97539

( * ) Notice: Subject to any disclaimer, the term of this patent is extended or adjusted under 35 U.S.C. 154(b) by 0 days.

(21) Appl. No.: 09/249,914

(22) Filed: Feb. 12, 1999

Related U.S. Application Data

(63) Continuation-in-part of application No. 08/800,921, filed on Feb. 13, 1997, now abandoned.

(51) Int. Cl.[7] ............................. B62K 21/12; B62K 21/26
(52) U.S. Cl. ......................... 74/551.8; D12/178; 362/72; 74/551.9; D8/356
(58) Field of Search ................ 74/551.8, 551.9; D12/178, 118, 114; D8/356, 303; 16/2, 111 R; 248/56; 362/72; 81/436, 438, 177.2

(56) References Cited

U.S. PATENT DOCUMENTS

| | | | |
|---|---|---|---|
| D. 314,700 | 2/1991 | Lurkis | D8/303 |
| D. 323,280 | 1/1992 | Chen | D8/303 |
| D. 340,432 | 10/1993 | Osborne | D12/114 |
| D. 376,124 | 12/1996 | Bernloehr | D12/178 |
| D. 412,306 * | 7/1999 | Berto | D12/178 |
| 628,383 * | 7/1899 | Bauroth | D12/118 X |
| 3,918,323 | 11/1975 | Prager | 74/551.8 |
| 3,937,629 | 2/1976 | Hamasaka | 74/551.8 |
| 4,623,954 | 11/1986 | Schott et al. | 362/72 |
| 4,656,564 | 4/1987 | Felder | 362/72 |
| 4,716,502 | 12/1987 | Schott et al. | 362/72 |
| 4,779,169 | 10/1988 | Cruze | 362/72 |
| 4,875,142 | 10/1989 | Spector | 362/72 |
| 4,893,519 | 1/1990 | Corso et al. | 74/551.9 |
| 4,900,291 | 2/1990 | Patterson | 474/80 |
| 4,964,192 | 10/1990 | Marui | 16/111 R |
| 5,008,782 | 4/1991 | Murray | 362/72 |
| 5,033,325 | 7/1991 | Giard, Jr. | 74/551.3 |
| 5,201,243 | 4/1993 | Schneider | 74/551.1 |
| 5,247,431 | 9/1993 | Liu | 362/72 |
| 5,285,696 | 2/1994 | Taylor | 74/551.1 |
| 5,301,570 | 4/1994 | Li | 74/551.1 |
| 5,507,202 | 4/1996 | Phillips | 74/489 |
| 5,517,878 | 5/1996 | Klein et al. | 74/551.3 |
| 5,580,152 | 12/1996 | Carter | 362/72 |
| 5,836,223 * | 11/1998 | Lin | 81/436 |

* cited by examiner

*Primary Examiner*—Vinh T. Luong
(74) *Attorney, Agent, or Firm*—Burns, Doane, Swecker & Mathis, LLP

(57) ABSTRACT

A handlebar device which engages the inside of a handlebar and has an enlarged end with a perimeter that is greater than the handlebar grip so that the user can push against the device with the side of their hand or pull on the device by grabbing onto the enlarged end. The device is anchored inside the handlebar by a cam system and a threaded fastener. The device can have an illumination element therein for providing additional lighting for the vehicle.

15 Claims, 4 Drawing Sheets

HANDLEBAR DEVICE

The application is a C-I-P of U.S. patent application Ser. No. 08/800,921 filed on Feb. 13, 1997, now abandoned the entire content of which is hereby incorporated by reference.

FIELD OF THE INVENTION

The present invention relates to handlebar grips and extensions, and more particularly to grips and extensions with a light therein and grips and extensions for use on vehicles that employ maximum rider input (i.e., use the rider's weight) when changing the direction of the vehicle.

BACKGROUND OF THE INVENTION

The use of personal outdoor vehicles, for example, snowmobiles, all-terrain vehicles, and personal watercraft, has grown in popularity as these vehicles have become faster, more responsive, more reliable, and more versatile. Because of the increased speed, reliability, and responsiveness of these vehicles, the rider must have control of the vehicle at all times, particularly at high rates of speed and when the rider is attempting to make tight turns or travel over uneven or sloped terrain. Maneuvering of these vehicles requires the rider to exert substantial force on the ends of the handlebars. For example, a snowmobile rider "bending" the snowmobile in deep powder may shift all of his/her weight to the inside of the turn and pull with both arms on the handlebar grips. In another example, a snowmobile rider turning left in deep powdery snow pulls on the left handlebar grip toward his chest and pushes on the right handlebar grip. The rider primarily pulls instead of pushes because of the risk of the rider's hand slipping off of the right handlebar grip because there is no stop on the end of the handlebar grip. The use of primarily only one arm during these high force turns causes considerable rider fatigue.

The increased speed and ever increasing numbers of personal vehicles in use is generating a need for greater visibility of these vehicles at farther distances away. In addition, these vehicles are commonly ridden at night because of their reliability.

Handlebar grips for helping the rider maintain a grip on the handlebar are well known in the art. For example, U.S. Pat. No. 4,893,519 shows a handlebar grip having a covering of flexible needles on a cylindrical tubular handgrip body which is slid over the free end of a handlebar and held in place by a stopper and screw anchor which engages the inside of the handlebar. U.S. Pat. No. 5,507,202 describes a motorcycle handlebar safety grip which fits axially onto a handlebar and has an elongated, hollow, main grip body with a stopper on the far end of the grip. U.S. Design Pat. Nos. 323,280 and 314,700 both show hollow handlebar grips which fit over a handlebar.

Devices for improving bicycle safety are also well-known. For example, U.S. Pat. Nos. 4,623,954, 4,656,564, 4,716,502, 4,875,142 and 5,247,431 show lights designed to fit into the hollow ends of the bicycle handlebars.

U.S. Pat. No. 4,779,169 shows a running light assembly integrated with the end of a motorcycle handlebar and hand grip. The assembly includes a tubular grip sized to fit over a tubular end portion of the motor cycle handlebar and a light bulb carried within the handlebar.

Handlebar devices which extend beyond the end of the handlebar and project generally perpendicular to the handlebar have been used to allow riders a better surface to pull against (see U.S. Pat. No. Des. 376,124).

Despite the usefulness of each of these devices for their intended purposes, there is a need for a handlebar device for use on outdoor personal vehicles which improves riding performance and vehicle safety.

SUMMARY OF THE INVENTION

The present invention is a device which engages the inside of a handlebar. The present invention anchors to the inside of the handlebar such that the invention can be used with an existing handlebar grip (and heater, if present). However, the device can also be integrally formed with its own grip. The enlarged end of the device has a perimeter greater than the handlebar grip, the rider can push against the device with the side of their hand such as during cornering, or grasp the device, such as during side-hilling (i.e., travelling across a sloping surface) without the rider's hand slipping off the end of the grip and with less fatigue. The enlarged end does not interfere with the rider's safety as the device does not have any long external projections that may contact the rider, windscreen, throttle, or brake lever.

In one aspect of the present invention, the device has an illumination element therewith to provide additional lighting to the vehicle for greater safety for the rider. The illumination element located on the ends of the handlebars can be seen from many directions with respect to the vehicle. In addition, the illumination element is relatively high on the vehicle so as to be seen from greater distance and is less likely to be obstructed by dust, dirt, mud, or snow. The illumination element can be wired to the brake light and turn signal system so as to provide redundancy to that system.

In another aspect of the invention there is provided a device associated with the grasping surface of a handle bar having a rigid first end with a perimeter larger than the perimeter of the grasping surface and an opening therethrough along an imaginary axis of the device, a member extending longitudinally away from the first end along the imaginary axis and dimensioned to fit within an opening in the handle bar, the imaginary axis extending the entire length of the device being coaxial with an imaginary axis of the grasping surface of the handle bar, an element configured to displace the longitudinally extending member, and an elongated member extending through the opening in the first end and engaging the element to force the longitudinally extending member against an internal surface of the handle bar.

In yet another aspect of the invention there is provided a device associated with a grasping surface of a handle bar having a rigid first end having a perimeter larger than the perimeter of the grasping surface and an opening therethrough and along an imaginary access of the device, a member extending longitudinally away from the first end along the imaginary axis and dimensioned to fit within an opening in the handle bar, an element configured to displace the longitudinally extending member, an elongated member extending through the opening in the first end and engaging the element to force the longitudinally extending member against an internal surface of the handle bar, and an illumination element located within the rigid first end.

It is contemplated that the illumination element may be a light bulb or other illuminating devices.

BRIEF DESCRIPTION OF THE DRAWINGS

As used herein, like reference numerals will designate similar elements in the various embodiments of the present invention wherein.

DETAILED DESCRIPTION OF THE PREFERRED EMBODIMENTS

Figure 1:
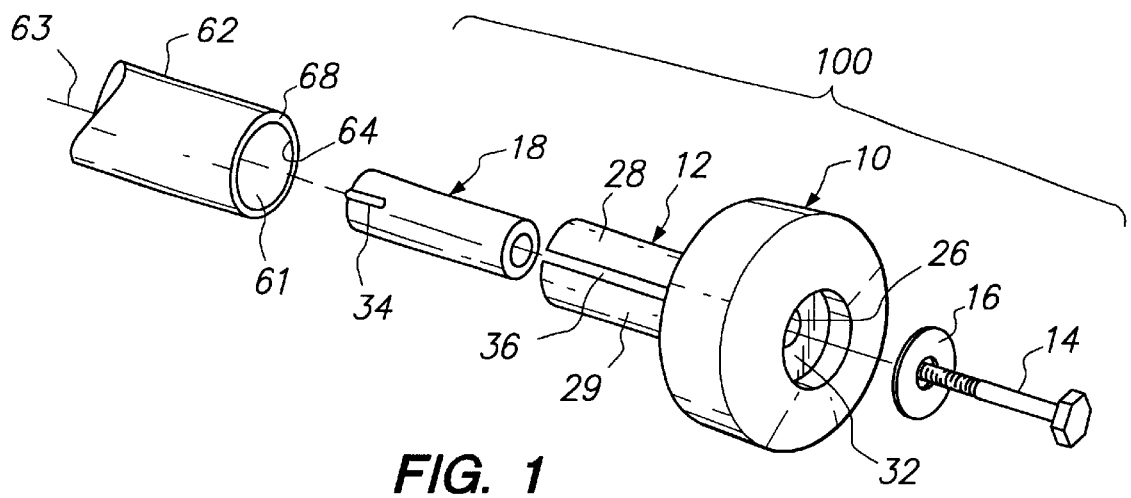
FIG. 1 is an exploded view in accordance with one embodiment of the device.

Referring to FIGS. 1–5 initially, there is shown device 100 for use with handlebar 62 of an outdoor personal vehicle such as, but not limited to, a snowmobile, all-terrain vehicle, or personal watercraft. The handlebar 62 having an axis 63 is shown without a grip thereon but one of ordinary skill in the art will recognize that a large variety of handlebar grips can be used. In the instance of a snowmobile, there can be heater tape (not shown) wrapped around the handlebar below the grip and wired into the snowmobiles electrical system to keep the rider's hands warm. The device 100 is attached to a handlebar having a conventional grip thereon by cutting away the end of the grip to expose the opening 64 in the end of the handlebar 62. The device 100 has a longitudinally extending member 12 which extends away from the enlarged end 10 along an axis 63 extending the length of the device 100. The enlarged end 10 is a disk shaped member, as shown in FIG. 1, and is also described herein as a rigid first end of the device. The member 12 is dimensioned such that it fits within the opening 64 in the handlebar 62. In this embodiment, the longitudinally extending member 12 is comprised of a pair of longitudinally extending curved fingers 28 and 29 which define a slot or key way 36 therebetween. It is within the scope of the invention that there may be multiple longitudinally extending curved fingers defining a plurality of slots.

Figure 3:
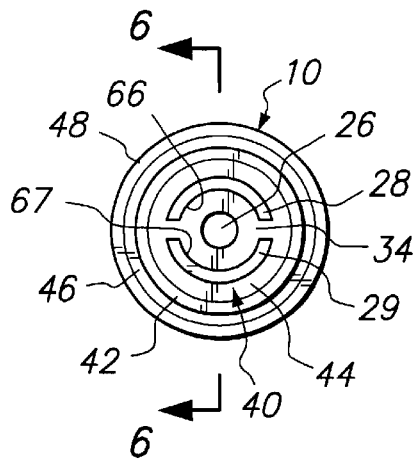
FIG. 3 is a left side elevational view of the device of FIG. 1.
Figure 9:
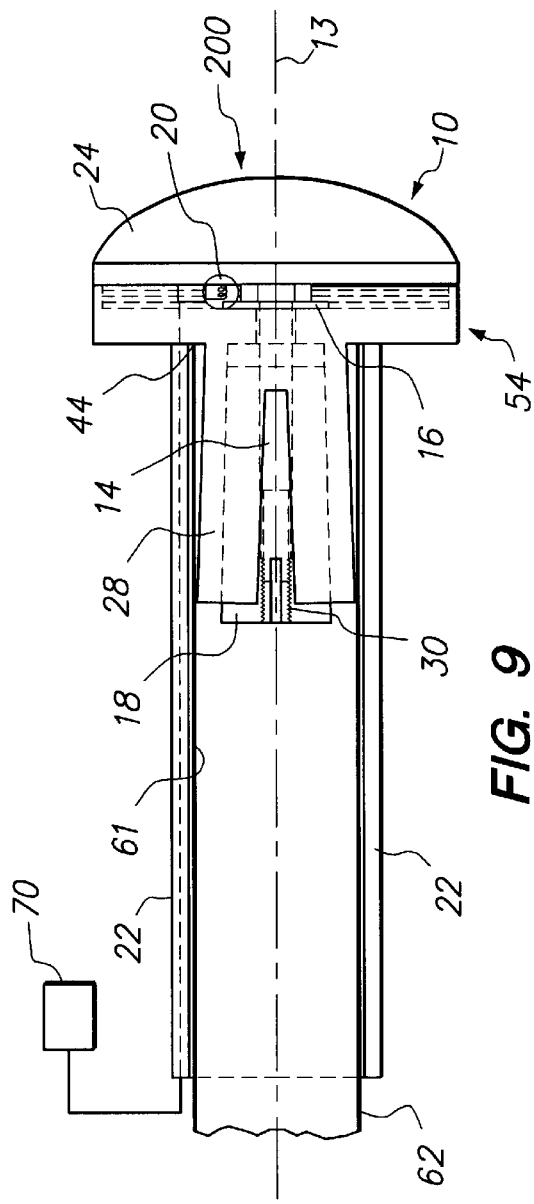
FIG. 9 is a partial cross-sectional view of a third embodiment of the device.
Figure 10:
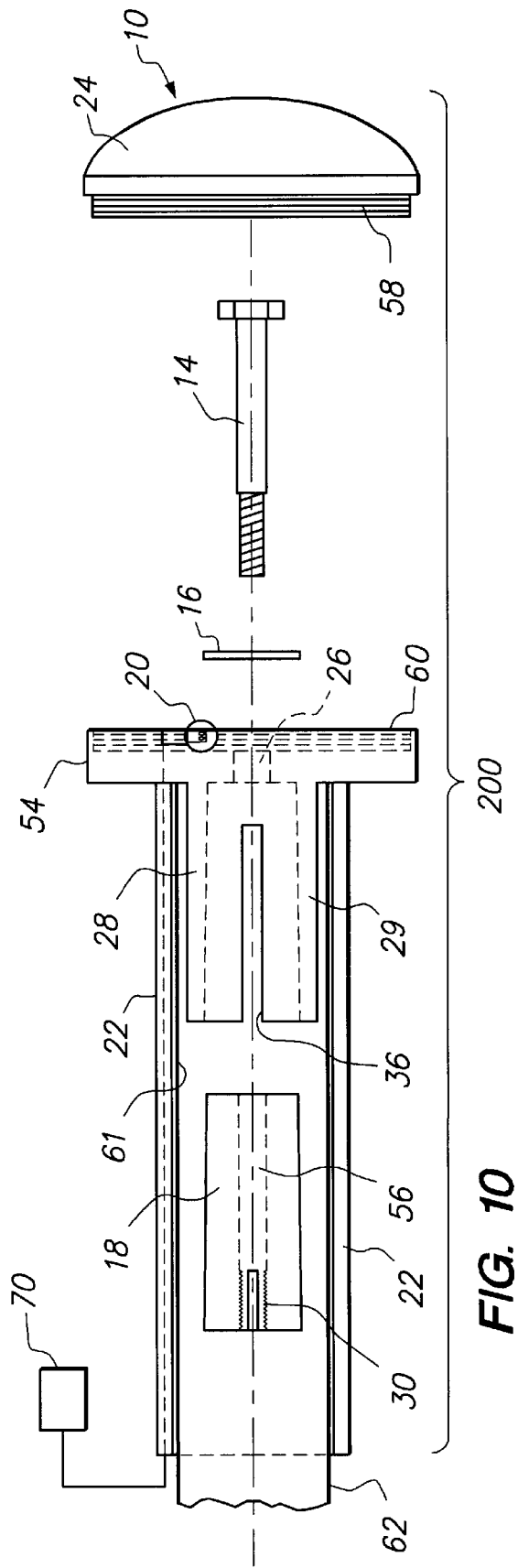
FIG. 10 is an exploded partial cross-sectional view of the device of FIG. 9.

A camming element 18 fits within the area defined by inner surfaces 66 and 67 of the curved FIGS. 28 and 29, respectively (FIG. 3). The camming element 18 is configured to displace the longitudinally extending fingers 28 and 29 outward. The camming element 18 has a central opening 56 therethrough with threads 30 therein (FIGS. 9 and 10). The camming element 18 is a conical frustum but as one of ordinary skill in the art will recognize other camming elements or shapes can be used as well. The element 18 has at least one protrusion or key 34 on its outer surface which fits into the slot or keyway 36 of the longitudinally extending member 12 to prevent the camming element 18 from rotating. The enlarged end 10 has a recess 32 and a central opening 26 therethrough that opens into the area defined by the inner surfaces 66 and 67 of the curved fingers 28 and 29, respectively. The head of a fastener 14 sits in the recess 32 for safety and appearance purposes. The fastener or elongated member 14 fits through the opening 26 to engage the threads 30 in the camming element 18. Initially, the fastener 14 is only threaded into the element 18 far enough to engage the threads 30 and pull the element 18 into the area between the curved fingers 28 and 29 just far enough for the key 34 to engage the slot 36.

Figure 6:
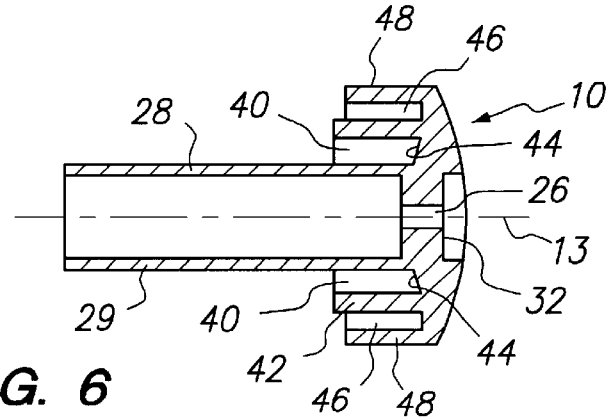
FIG. 6 is a cross-sectional view of the device of FIG. 3 taken along line 6—6.

In the assembled condition, the distal end of the element 18 and of the fingers 28 and 29 are inserted into the opening 64 of the handlebar 62. The device 100 is pushed into the handlebar 62 until the end surface 68 of the handlebar abuts a surface 44 (FIGS. 6 and 9) of the enlarged end 10 at which position the distal end of the handlebar 62 is located in the annular cavity 40 formed between the outer surface of the curved fingers 28 and an inner surface of an inner annular wall 42. The inner annular wall 42 extends around the outer surface of the distal end of the handlebar 62 when surface 68 abuts surface 44 to provide additional support. The fastener 14 is then rotated clockwise to pull the camming element 18 farther into the area between the curved fingers 28 and 29 to force the fingers against the inner surface 61 of the handlebar 62, thus anchoring the device 100 within the handlebar 62 (FIG. 9) by friction fit. An optional washer 16 can be used to protect the device. In this way, the device 100 is anchored inside of the handlebar such that a user can push against the surface formed by an outer annular wall 48 or pull on the device 100 by grasping the enlarged rigid end 10 without the device becoming dislodged from the handlebar. In addition, the user does not have to replace the existing grip or reduce the grasping area available on the handlebar.

The outer annular wall 48 and the inner annular wall 42 define an annular cavity 46 (FIG. 6) which allows for slight expansion of the annular wall 42 if the handlebar 62 fits snugly into the annular cavity 40.

Figure 8:
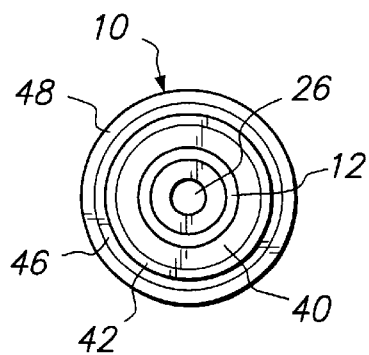
FIG. 8 is a left side elevational view of the second embodiment of the device.
Figure 4:
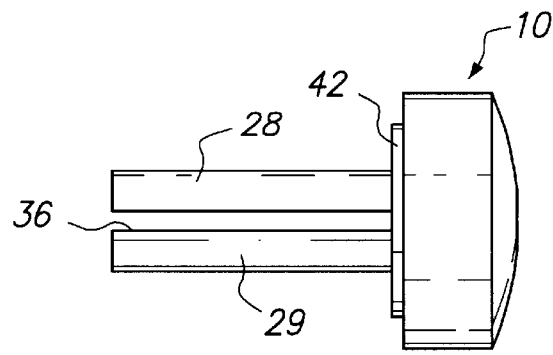
FIG. 4 is a front elevational view of the device of FIG. 1.
Figure 5:
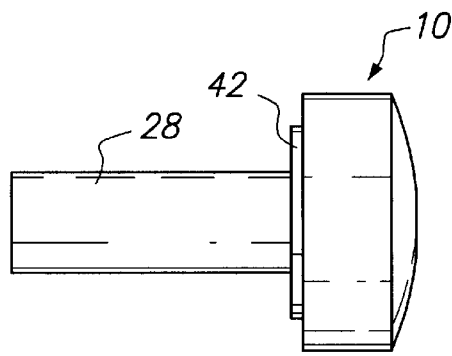
FIG. 5 is a top plan view of the device of FIG. 1.
Figure 7:
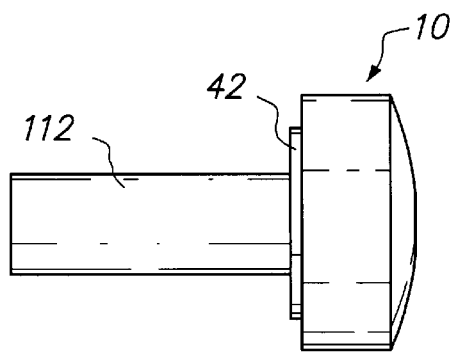
FIG. 7 is a front elevational view of a second embodiment of the device.

An alternative embodiment for the device 100 is shown in FIGS. 7 and 8. The longitudinally extending member 112 is a single cylindrical member that is expandable without using slots (such as in the first embodiment) or grooves in the member 112. As the camming element 18 is drawn into the member 112, the cylindrical member 112 expands to contact the internal surface of the handlebar as described previously.

FIGS. 9 and 10 depict a cross-sectional view of a third embodiment of the device. The device 200 is substantially the same as device 100 described above and operates substantially the same. The device 200 has two differences from the device 100. First, the device 200 has a grip 22 integrally formed with the device which replaces an existing discrete handlebar grip that may already be on the handle bar. The grip 22 is slid over the handlebar 62 and can be used with or without existing handlebar heating tape. The grip 22 may also be described herein as a handlebar grasping surface or a grasping surface of a handlebar. Second, the device 200 has an illumination element 20 located within the enlarged end 10. The illumination element 20 is in electrical communication with the lighting system 70 of the vehicle. The enlarged end 10 comprises a removable cover 24 which attaches to a base 54 either by press fit or threadingly. An annular surface 58 of the cover 24 fits snugly or threadingly into the recess 60 in the base 54. The removable cover 24 allows access to the illumination element 20 and the fastener 14.

The illumination element 20 can be a 12 volt incandescent bulb that remains illuminated at a constant intensity when power is applied to provide safety lighting like running lights for the vehicle. The illumination element 20 can also be wired to the brake lights and/or turn signals of the vehicle to provide additional safety. Other illuminating elements can be used such as, but not limited to, electroluminescent lights, chemical luminescent lights, and light emitting diodes.

It is within the scope of the invention that the handlebar device 100 and 200 may include either the integrally formed grip 22, the illumination element 20, or both (as shown in FIGS. 9 and 10).

Figure 11:
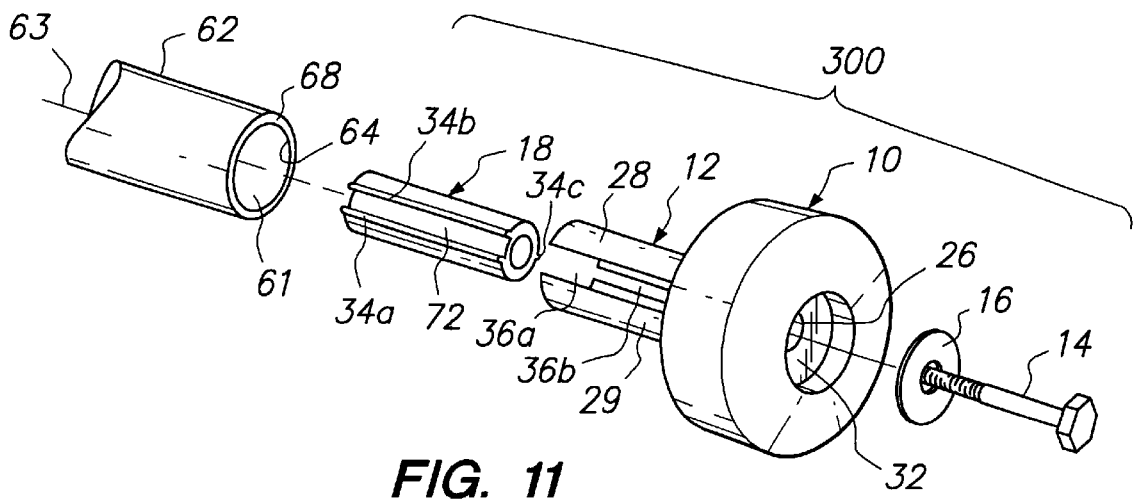
FIG. 11 is an exploded perspective view in accordance with a fourth embodiment of the invention.

FIG. 11 illustrates an alternative embodiment of a device 300 according to the present invention which is configured to receive electrical wires for uses such as heating of the handlebar grip or illumination of the handlebar end. The device 300 includes the enlarged end 10 and the longitudinally extending member 12 extending from the enlarged end. The longitudinally extending member 12 includes two C-shaped arms or curved fingers 28 and 29. These curved fingers 28 and 29 are separated by two slots or keyways 36a and 36b.

The camming element 18 in the embodiment of FIG. 11 is provided with a recess 72 which extends in a longitudinal direction along an exterior of the camming element. The recess 72 is configured to accommodate electrical wires which may be used to provide energy to an illumination system in the enlarged end 10 as shown in the embodiment of FIGS. 9 and 10. Alternatively, the electrical wires provided in the recess may be used to deliver energy to heating tape which is wrapped around the handlebar 62 in the conventional manner. In this case the electrical wires extend from an interior of the handlebar 62, through the recess 72, and around the end 68 of the handlebar to the heating tape. The electrical wires may be connected to the illumination system, the heating system, or both systems.

Along each side of the recess 70 are first and second keys 34a and 34b which abut opposite edges of the larger keyway 36a and guide the camming element 18 in the longitudinally extending member 12. A third key 34c on an opposite side of the camming element 18 fits into the smaller keyway 36b of the longitudinally extending member 12. The device 300 of FIG. 11 operates in the same manner as the other embodiments described above. In particular, tightening of the fastener 14 causes the camming element 18 to be pulled into the longitudinal extending member 12 spreading the fingers 28 and 29 apart and forming a friction fit between the exterior of the fingers and the interior of the handlebar 62.

Figure 2:
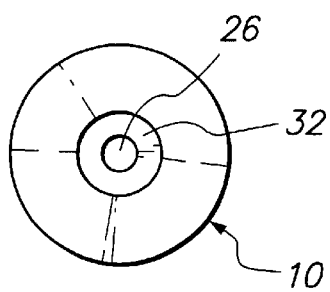
FIG. 2 is a right side elevational view of the device of FIG. 1.
Figure 12:
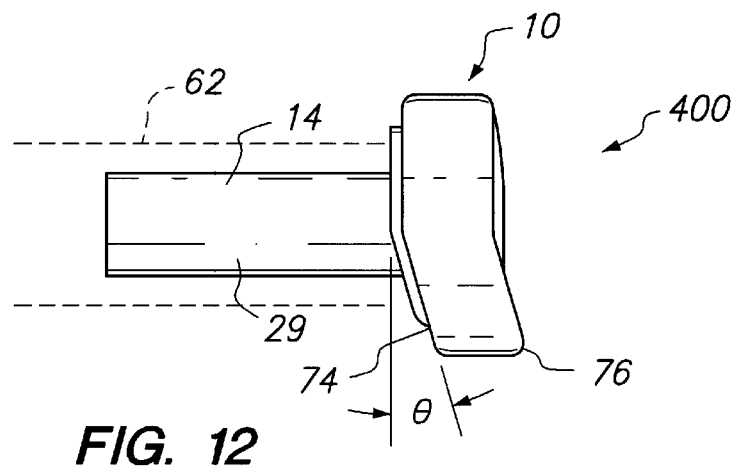
FIG. 12 is a top plan view of an alternative embodiment of the device with a swept design.

FIG. 12 illustrates an alternative embodiment of the device 400 with a swept design. The swept design is more comfortable for the user and prevents fatigue, bruising, and chafing due to extended use. This swept design for the device 400 is particularly configured to be received on handlebars which when viewed in a top view are angled to the rear of the vehicle towards the rider. The angle handlebar configuration is conventional for snowmobiles. When the device 400 is used with a vehicle having these angled handlebars, a cutaway or outwardly swept inner corner 74 of the disk shaped enlarged end 10 prevents the enlarged end from digging into the side of the user's palm during extended use. The term outwardly swept corner is used to described a corner which is angled outwardly away from the handlebar. The corner 74 is cut away at an angle $\theta$ of approximately 10 to 40 degrees, preferably about 10 to 30 degrees and more preferably about 20 degrees. An outer corner 76 opposite the inner corner 74 may also be angled outwards away from the handlebar to provide a relatively constant thickness of the disk shaped end 10. The end view of the swept embodiment of the device 400 is disk shaped as shown in FIG. 2. The angled portion of the disk shaped end 10 preferably extends around about one quarter to one half of the circumference of the end, more preferably between one third and one half of the circumference.

The devices 100, 200, 300, and 400 according to the present are preferably molded of a rigid plastic material with the enlarged end 10 and the longitudinally extending member 12 integrally molded. The camming member 18 may include a threaded insert of metal which is molded into the body of the member to prevent rotation.

While several particular embodiments of the invention have been illustrated and described, it will be apparent that various modifications and variations can be made without departing from the spirit and scope of the invention. Accordingly, it is not intended that the invention be limited, except as by the appended claims.

I claim:

1. A handlebar device for insertion in an end of a handlebar, the device comprising:

a longitudinally extending member dimensioned to fit within the end of the handlebar and having a substantially cylindrical shape;

a disk shaped member integrally fixed to the longitudinally extending member in a coaxial manner, the disk shaped member having a diameter larger than a diameter of the longitudinally extending member;

a bore extending through the disk shaped member and the longitudinally extending member along an axis of the disk shaped member and the longitudinally extending member;

a cam element having a central threaded bore and a cam surface which engages a corresponding cam surface of the longitudinally extending member to create a friction fit between the handlebar device and interior surfaces of the handlebar;

a threaded fastener for moving the cam surface of the cam element against the corresponding cam surface of the longitudinally extending member to secure the handlebar device in the end of the handlebar;

a longitudinal recess extending through the longitudinally extending member for receiving electric wires; and an illumination element and electric wires connected to the illumination element which extend through the longitudinally extending recess, wherein the illumination element is located within the disk shaped member and is in electrical communication with a lighting system.

2. The device of claim 1, wherein the longitudinally extending member comprises curved fingers and the cam element is a conical frustum having the central threaded bore therein, the conical frustum being received between the curved fingers such that when the threaded fastener engages the internal threads of the conical frustum the curved fingers are forced against the internal surface of the handle bar.

3. The device of claim 1, wherein a handlebar grasping surface is integrally formed with the device.

4. The device of claim 1 in combination with a handlebar, wherein a handlebar grasping surface is a discrete handle bar grip.

5. The device of claim 1 further comprising an outwardly swept corner of the disk shaped member extending along approximately one half of a circumference of the disk shaped member.

6. The device of claim 1, wherein the longitudinally extending member and the disk shaped member are integrally formed as one piece.

7. A handlebar device for insertion in an end of a handlebar, the device comprising:

a longitudinally extending member dimensioned to fit within the end of the handlebar and having a substantially cylindrical shape;

a disk shaped member integrally fixed to the longitudinally extending member in a coaxial manner, the disk shaped member having a diameter larger than a diameter of the longitudinally extending member;

a bore extending through the disk shaped member and the longitudinally extending member along an axis of the disk shaped member and the longitudinally extending member;

a cam element having a central threaded bore and a cam surface which engages a corresponding cam surface of the longitudinally extending member to create a friction fit between the handlebar device and interior surfaces of the handlebar;

a threaded fastener for moving the cam surface of the cam element against the corresponding cam surface of the longitudinally extending member to secure the handlebar device in the end of the handlebar;

a longitudinal recess extending through the longitudinally extending member for receiving electric wires; and an illumination element and electric wires connected to the illumination element which extend through the longitudinally extending recess, wherein the disk shaped member further comprises a removable cover which allows access to the elongated member and the illumination element.

8. A handlebar device associated with a grasping surface of a handlebar, comprising:

a rigid first end having a perimeter larger than the perimeter of the grasping surface and an opening therethrough along an axis of the device;

at least two curved fingers fixed to and extending longitudinally away from the first end, the curved fingers dimensioned to fit within an opening in the handlebar;

a cam element configured to fit between the curved fingers and displace the curved fingers outward;

an elongated member extending through the opening in the first end and engaging the cam element to force the curved fingers outward against an internal surface of the handle bar; and an illumination element located within the rigid first end.

9. The device of claim 8, wherein the illumination element is located within the rigid first end and is in electrical communication with a lighting system.

10. A handlebar device associated with a grasping surface of a handlebar, comprising:

a rigid first end having a perimeter larger than the perimeter of the grasping surface and an opening therethrough along an axis of the device;

at least two curved fingers fixed to and extending longitudinally away from the first end, the curved fingers dimensioned to fit within an opening in the handlebar;

a cam element configured to fit between the curved fingers and displace the curved fingers outward;

an elongated member extending through the opening in the first end and engaging the cam element to force the curved fingers outward against an internal surface of the handle bar; and wherein the at least two curved fingers have first ends and second ends, wherein the first ends of the at least two curved fingers are immovably fixed to the rigid first end while the second ends of the at least two curved fingers flex outward against the internal surface of the handlebar.

11. The device of claim 10, wherein the cam element is a conical frustum having internal threads therein, the conical frustum being received between the curved fingers such that when the elongated member threadingly engages the internal threads of the conical frustum the curved fingers are forced against the internal surface of the handle bar.

12. The device of claim 10, wherein the grasping surface is integrally formed with the device.

13. The device of claim 10, in combination with a handlebar, wherein the grasping surface is a discrete handle bar grip.

14. The device of claim 10, further comprising a longitudinal recess in the elongated member for receiving electrical wires.

15. The device of claim 10, further comprising an outwardly swept corner of the rigid first end extending along approximately one half of a circumference of the rigid first end.

* * * * *